Jan. 13, 1970   M. H. ROBERTS   3,490,040
LINEAR BROAD RANGE MOISTURE CONTENT MEASURING INSTRUMENT
Filed Oct. 23, 1967
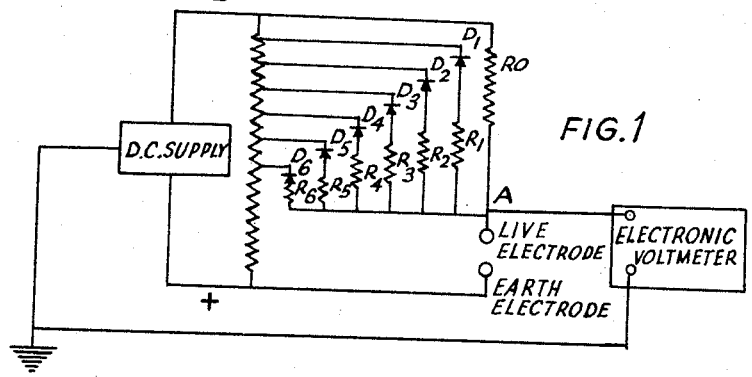
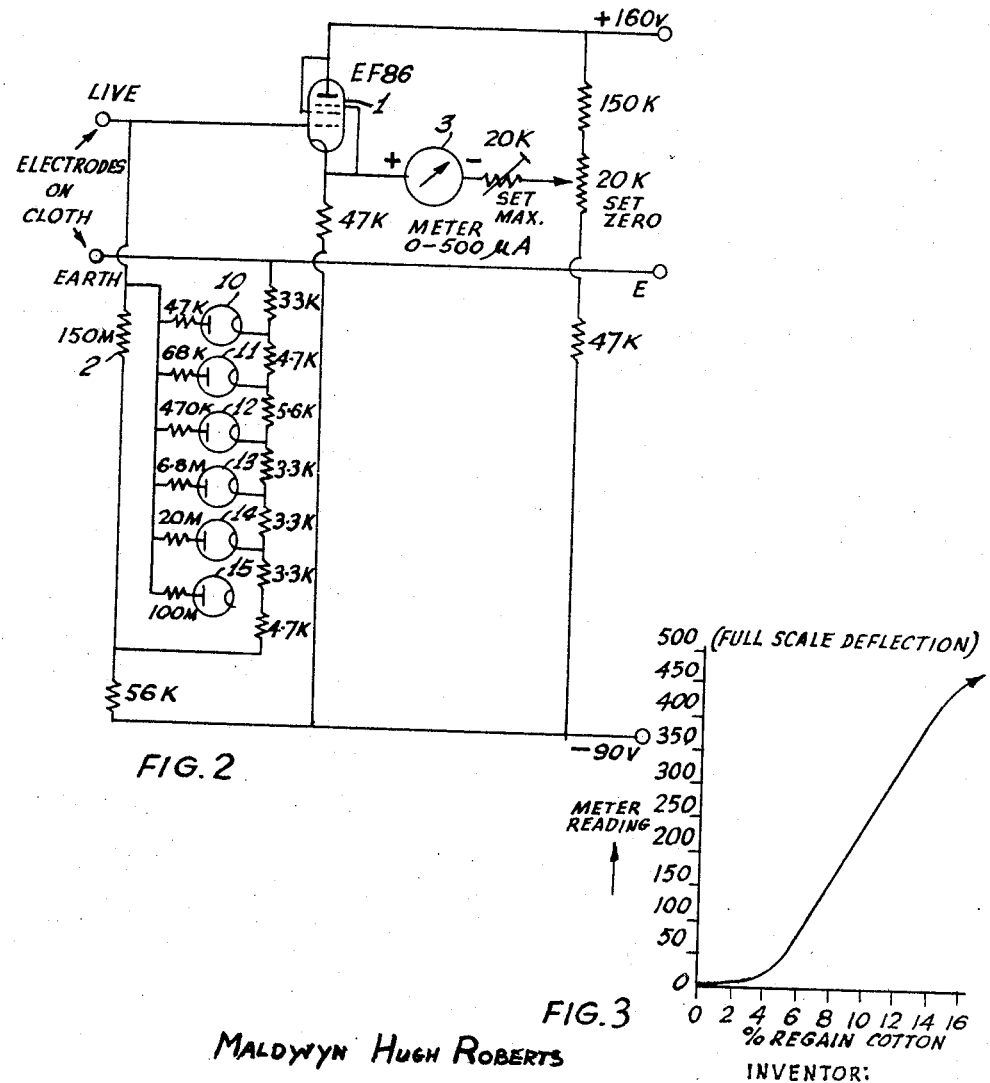
MALDWYN HUGH ROBERTS
INVENTOR:
Bierman & Bierman, Esqs
by

United States Patent Office 3,490,040
Patented Jan. 13, 1970

3,490,040
LINEAR BROAD RANGE MOISTURE CONTENT MEASURING INSTRUMENT
Maldwyn Hugh Roberts, Stockport, England, assignor to Cotton Silk and Man-Made Fibres Research Association, Shirley Institute, Didsbury, Manchester, England, a corporation of Great Britain
Filed Oct. 23, 1967, Ser. No. 677,271
Claims priority, application Great Britain, Oct. 21, 1966, 47,205/66
Int. Cl. G01r 27/02
U.S. Cl. 324—65                5 Claims

ABSTRACT OF THE DISCLOSURE

An instrument for the measurement of the moisture content of materials provides a substantially linear output signal over a wide range of moisture contents. The instrument includes a D.C. power supply, electrodes adapted to be connected across the material being tested, a load resistance in series with the electrodes and the power supply, and a high impedance moisture-indicating or control device connected either across the load resistance or across the electrodes. A number of other resistors, of different resistances, are each in series with a diode, forming a network. The network is connected to the connection between the load resistance and an electrode. Each diode is also connected to a source of differing potential from the others.

---

This invention concerns a moisture sensitive instrument.

A number of instruments exist for measuring the moisture content of materials, for example textiles, wood or grain, by measuring their electrical resistivity. An attractive feature of this method is that a slight change in moisture content results in a large change in resistance which is easy to detect and measure. The resistance may change by a factor of thousands, even up to a million, over the range of moisture content which is of practical interest, from quite low in a wet material to extremely high in a very dry material. However, while it is easy to obtain a meter reading which responds to the slightest variation in moisture content, the relation between moisture content and meter reading (e.g. of current through the sample or voltage across it) is very non-linear unless special circuit arrangements are used to try to linearize it.

The simplest circuit used in conventional moisture meters of this type applies a voltage across the sample in series with a fixed resistor so that the total voltage is shared between them in proportion to their respective resistances, and the voltage at their junction, relative to either terminal of the source, is measured by an electronic voltmeter. This arrangement is most sensitive when the two resistances are of similar values and least sensitive when they differ widely, giving a scale very open in the middle and cramped at the extreme ends. Such an instrument gives a useful indication over a very narrow range only, so it is common practice to provide a multi-way selector switch to change the value of the fixed resistor to enable this narrow band to be shifted up or down the whole range of interest.

Apart from the inconvenience of such an instrument for general use, it has a particular disadvantage when used as the measuring part of an automatic control system, as the electrical signal produced by a large deviation from the controlled value will be little more than that produced by a small deviation, whereas it is generally desirable in many types of automatic control system that the relation between signal and deviation should be reasonably linear.

It should perhaps be mentioned, that a common method used to obtain a more nearly linear relationship is to put a diode or diode type device in series with the sample, either in place of or in series with the normal series resistor. Since the relationship between current and voltage in such a device is essentially logarithmic (voltage proportional to logarithm of current) over several decades of current, this enables a wide range of sample resistance to be covered with less severe nonlinearity. However, there is still more curvature than is desirable for some control purposes, and other disadvantages are that the output voltage is small and very dependent on the temperature of the diode device, so that amplification is needed and drift can be troublesome unless care is taken to stabilize temperature.

One way in which one might attempt to produce an output linearly related to moisture content is to feed the output from either of the aforementioned circuits into a special type of amplifier circuit having a non-linear relation between input and output intended to compensate for the non-linearity in the measuring circuit. The objection to this when used with the simple measuring circuit first described is that the signal fed from the measuring circuit to the non-linear amplifier is so severely distorted that the gain of the non-linear amplifier will have to be varied over a range of between 1,000 to 1 and 1,000,000 to 1, to give the required correction. The result is likely to be high cost and poor accuracy, as in some parts of the range the input signal corresponding to a given change in moisture content will be so small.

Even if the measuring circuit includes a diode as previously described to partially linearize the relationship, followed by a non-linear amplifier to complete the linearization, there is still the objection that the signal from the measuring circuit (across its diode) is small and susceptible to temperature variations, and the combined circuit is complex and expensive.

It is an object of this invention to provide an instrument which gives an electrical signal for purposes of indication or of automatic control or both, which varies in a substantially linear manner with moisture content over a considerable range, and to do this with a simple and economical circuit giving good accuracy and stability, that is to say to provide a circuit in which the voltage arising at the sample electrode already has the required linear relationship with moisture content, without extraneous compensation in a later stage.

Thus, according to the present invention, a moisture sensitive instrument comprises D.C. power supply means connected across a load resistance in series with electrodes adapted to be connected across the material under test, a high impedance device sensitive to the potential across either said load resistance or said electrodes to give an electrical signal suitable for actuation of means for displaying the moisture content of the material under test or control means for controlling the moisture content of the material under test, and a plurality of further resistances each in series with a diode connected on the one hand to the junction between the load resistance and said electrodes and on the other hand to a series of points at different potentials intermediate the positive and negative potentials of said power supply means, whereby the effective resistance of said load resistance varies as the resistance of the material under test varies in such a manner that the voltage across the material under test varies in a desired manner with the moisture content thereof.

Preferably the arrangement is such that the voltage across the material under test varies in a substantially linear manner with the moisure content thereof.

The invention will be further apparent from the following description, with reference to the several figures of the accompanying drawing which show, by way of example only, one form of moisture sensitive instrument embodying the invention.

Of the drawings:

FIG. 1 shows a theoretical circuit diagram of the instrument;

FIG. 2 shows a practical example of the circuit of FIG. 1; and

FIG. 3 shows a graph giving the results of practical tests using the circuit of FIG. 2.

As has been described, a basic measuring circuit consists of a source of voltage applied across two resistances in series, of which one is the sample of material and the other is an external resistor. The current flowing is often too small to measure directly with an ordinary meter, so the voltage drop it produces in this external resistor is measured by means of a high impedance electronic voltmeter. We have seen that it is necessary to switch this external resistor to different values to cover different ranges of moisture content. In the present invention, this is in effect done automatically and in a smooth progressive way instead of in sudden steps.

Referring now to FIG. 1 it will be seen that the basic external resistor is $R_0$, and also connected to the "live" electrode are resistors $R_1$, $R_2$, etc., each being returned via a diode $D_1$, $D_2$, etc. to a voltage intermediate between the two terminals of the source, such as can conveniently be provided by one or more potential dividers across the source. If one considers the sample between the electrodes to start by having infinite resistance and to become gradually moister so that its resistance falls progressively, the voltage drop across $R_0$ is zero at first, increasing gradually. The polarity of connection of diodes $D_1$ etc. is such that they are reverse biased by the potential divider and therefore no current flows through $R_1$, $R_2$, etc. until the voltage appearing at point A overcomes the bias on the particular diode. Thus as the voltage drop across $R_0$ rises, diodes $D_1$ then $D_2$, then $D_3$ etc., start to conduct in turn and thus $R_1$, then $R_2$, then $R_3$ etc., are progressively switched in parallel with $R_0$ so as to reduce its effective value. When the sample is at the wet end of the measuring range, its resistance is low and all the diodes are conducting so that all the resistors $R_0$, $R_1$, $R_2$, etc. are in parallel giving a low effective load resistance.

In a typical circuit using this principle, $R_0$ might be of the order of 150 megohms, $R_6$ perhaps 47,000 ohms, with intermediate values for $R_1$–$R_5$. The voltage of the source may be about 30 volts (not exceeding about 60 volts because of danger of shocks) and the voltages to which the diodes are biased would be at intervals of about 3 volts, obtained from any convenient arrangement of resistors or other potential divider such as diodes or Zener diodes. It is usually convenient but not essential to have the bias on each diode adjustable over a small range, and by this means or by varying the values of resistors $R_1$, $R_2$ etc., the shape of the graph relating output voltage to moisture content can be adjusted to be substantially linear over a substantial range, e.g. a moisture content of 4% to 16% in a cotton fabric. The output voltage obtained over this range may be some 70 to 80% of the source voltage, so that it can easily be measured by simple circuits and is large enough to use without further amplification in many control circuits. It thus reduces the complexity and cost of measurement and control circuits.

The diodes used should preferably have reverse resistance of the order of 1000 megohms or more, so that their presence has no significant effect until there is a forward voltage on them. The polarity of both source and diodes may of course be reversed together if an output signal of opposite polarity is desired.

Since the resistance of each diode changes from a very high to a very low value over a voltage range of only a volt or so, which is small compared with the total output voltage range of the circuit, the effects of varying temperature are much less serious than in the circuit previously described using one or more diodes as the main component of the load resistance, without the biasing voltages used in the present invention. Most of the voltage drop occurs across the fixed resistors $R_0$, $R_1$ etc., and only a small proportion of the total voltage is dropped across the diodes.

Also there is considerable freedom to shape the curve as desired by choice of bias voltage and resistance, whereas circuits using diodes as the main component of load resistance offer little if any scope for varying the shape of the curve.

FIG. 2 shows the actual circuit diagram of an example which has been constructed of this improved moisture meter, and FIG. 3 shows the relationship obtained experimentally between regain (for cotton) and meter reading. The calibration was performed using various fixed resistors of known values in place of the sample and converting these to regain by means of a calibration curve giving the known relationship between resistance and regain for cotton fabric. The values of load resistance used in the circuit were first estimated by means of a graphical construction using load lines, but the final values and those of the resistors in the potential divider were arrived at by an empirical process of successive approximation based on the shape of the graph obtained of regain against meter reading. While it should be possible to calculate the required values, it is a laborious and cumbersome process, whereas the resistors can quickly be changed and the effect on the graph seen.

The cathode follower circuit 1, including pentode tube of the type EF86, is essentially a voltmeter of extremely high input resistance, so that it does not influence the magnitude of the voltage appearing across the load resistor 2, and its response is essentially linear. Its output may be passed as desired to meter 3, or to recorder or control circuits, and may be passed through filter circuits to attenuate rapid fluctuations which it is not desired to use.

Typically, the output of such a voltmeter may be a few milliamps into a meter or pen recorder, and/or about 10 to 20 volts into a control system.

It will be appreciated that it is not intended to limit the scope of the invention to the above example only, many variations, such as might readily occur to one skilled in the art being possible.

Thus, in place of the cathode follower, any amplifying device having a high input resistance, e.g. a field effect transistor, or a vibrating capacitor D.C. amplifier, may be used.

Thermionic diodes 10–15 of type EB91 were used in the example shown, but semiconductor diodes of extremely low reverse leakage current are now available and could be used. Obviously as resistances of over 100 megohm occur, and as the resistance of the sample itself may reach thousands of megohms when very dry, every care must be taken to eliminate unwanted electrical leakage.

To cater for measurement of moisture content in different materials having a different relationship between moisture content and resistance, it would be possible to provide alternative sets of resistors so as to give the desired linear direct-reading scale.

Moreover, the shape of the input-output relationship of the moisture meter circuit may if desired be altered somewhat from the normal linear relationship to suit the requirements of particular types of indicator or control systems, so as to obtain better control characteristics.

What is claimed is:

1. A moisture sensitive instrument comprising a D.C. power supply means, a load resistance, and electrodes adapted to be connected across the material under test, said power supply and load resistance and electrodes being connected in series a high impedance device connected at one end to the junction between the load resistance and said electrodes and at the other end to said supply means, said high impedance device being responsive to the potential of the element it is across and producing an output signal which is a function of that potential, a plurality of further resistances and a plurality of diodes, each further resistance being in series with a diode; each diode and its associated resistance being connected at one of its terminals to said junction and at the other of its terminals to one of a series of points at different potential intermediate the positive and negative potentials of said power supply means, whereby the effective resistance of said load resistance varies as the resistance of the material under test varies in such a manner that the voltage across the material under test varies in a desired manner with the moisture content thereof.

2. A moisture sensitive instrument according to claim 1 wherein said plurality of further resistances and said intermediate potentials have values such that the voltage across the material under test varies in a substantially linear manner with the moisture content of the material under test at least over a predetermined range.

3. A moisture sensitive instrument according to claim 1 wherein said high impedance device comprises a cathode follower circuit.

4. A moisture sensitive instrument according to claim 1 wherein said high impedance means has terminals adapted to be connected to means for displaying the moisture content of the material under test.

5. A moisture sensitive instrument as in claim 1 wherein the high impedance device has terminals adapted to be connected to control means for controlling the moisture content of the material under test.

References Cited

UNITED STATES PATENTS

| | | | |
|---|---|---|---|
| 2,456,499 | 12/1948 | Fritzinger | 324—65 X |
| 2,958,820 | 11/1960 | Volk | 324—65 |

EDWARD E. KUBASIEWICZ, Primary Examiner

U.S. Cl. X.R.

323—97; 324—115